United States Patent [19]

Petersen et al.

[11] Patent Number: 4,646,994

[45] Date of Patent: Mar. 3, 1987

[54] SPACECRAFT SUPPORT AND SEPARATION SYSTEM

[75] Inventors: Jacob E. Petersen, Cinnaminson; Daniel L. Balzer, Plainsboro, both of N.J.

[73] Assignee: RCA Corporation, Princeton, N.J.

[21] Appl. No.: 735,053

[22] Filed: May 17, 1985

[51] Int. Cl.[4] .................................................. B64G 1/64

[52] U.S. Cl. ........................... 244/158 R; 244/137 R; 244/161

[58] Field of Search ............ 244/118.1, 137 R, 137 A, 244/158 R, 160, 161, 172; 89/1.51, 1.59, 1.58, 1.57

[56] References Cited

U.S. PATENT DOCUMENTS

| | | | |
|---|---|---|---|
| 2,869,523 | 1/1959 | Murphy | 244/137 A |
| 3,547,375 | 12/1970 | Mackey | 244/158 R |
| 4,300,737 | 11/1981 | Byrne et al. . | |
| 4,355,775 | 10/1982 | Ganssle . | |
| 4,359,201 | 11/1982 | Thomson et al. | 244/158 R |

*Primary Examiner*—Galen Barefoot

*Attorney, Agent, or Firm*—Joseph S. Tripoli; Robert L. Troike

[57] ABSTRACT

A support structure for a satellite/perigee stage assembly in the cargo bay of a shuttle orbiter is provided by a cradle assembly. The perigee stage is latched to the cradle assembly by three releasable latches which catch trunnions extending from fittings on the perigee stage. Springs are compressed between the cradle and the perigee stage and a retaining cable is tightly fixed between the perigee stage and the cradle assembly to hold the satellite/perigee stage in place when the latches are retracted and allow them to be reclosed. The cable when severed provides a single point release. The satellite/perigee stage assembly is separated from the shuttle cargo bay without significant spinning of rotation being imparted thereto.

12 Claims, 6 Drawing Figures

SPACECRAFT SUPPORT AND SEPARATION SYSTEM

This invention relates to a system and method for separation of a spacecraft from a launch vehicle such as the U.S. Space Transportation System (STS), more commonly referred to as the Space Shuttle or Orbiter.

The advent of the U.S. Space Transportation System (STS) introduced new requirements and conditions for the launching of manned and unmanned spacecrafts. With few exceptions these spacecrafts will be transferred from the orbit achieved by the orbiter to a different orbit inclination and or altitude appropriate to the particular mission of the spacecraft. Several methods of ejection and separation of the spacecraft from the orbiter have been described, depending on the size, weight, configuration and mission of the spacecraft. Small spacecraft with limited requirements for orientation can be simply spring ejected with sufficient separation velocity to avoid collision or contact with any part of the orbiter. Somewhat larger spacecraft might employ the Spin Stabilized Upper Stage-Delta module (SSUS-D) which contains an electrically driven spin table to impart an attitude reference and inertial stability to the spacecraft/perigee motor assembly prior to and during separation. Still larger spacecraft could use a Spin Stabilized Upper Stage-Atlas (SSUS-A). A "frisbee" style separation of large cylindrical spacecraft has been used, for example in the LEASAT. Very large spacecraft might utilize the inertial upper stage with its own fully autonomous free axis—attitude reference and control capability. In addition, the Shuttle Manipulator Arm, a long articulated boom operated by the orbiter crew is planned for use in removing various payloads from the orbiter cargo bay and releasing them as "free flying vehicles".

Each of these deployment methods for sizeable spacecraft (together with their perigee motors) entails respective mechanisms that ensure safe separations from the orbiter while maintaining an attitude reference supplied initially by the orbiter. For both the SSUS-D and SSUS-A classes of spacecraft these mechanisms include a spin table as part of the support cradle. Hence, the required volume envelope in the orbital bay is a swept volume of the rotating assembly (plus a small divergent cone to allow for deviation from the actual linear motion during separation). The present invention eliminates both the spin table mechanisms and the rotary swept volume requirement. The present invention provides a spring ejection system with minimum tip-off errors and without inducing spin on the spacecraft.

SUMMARY OF THE PRESENT INVENTION

In accordance with one embodiment there is provided a spacecraft separation apparatus from a launch vehicle such as the shuttle that includes retractable latches for latching the spacecraft to the support structure such as the cradle mounted in the bay, spring means for ejecting the spacecraft and a retaining element between said spacecraft and support structure such as the cradle for retaining the spacecraft against the spring means when said latches are opened and a disconnecting means for disconnecting said retaining element after said latches are opened to provide a single point release of the spacecraft.

DESCRIPTION OF THE PREFERRED EMBODIMENT

Figure 1:
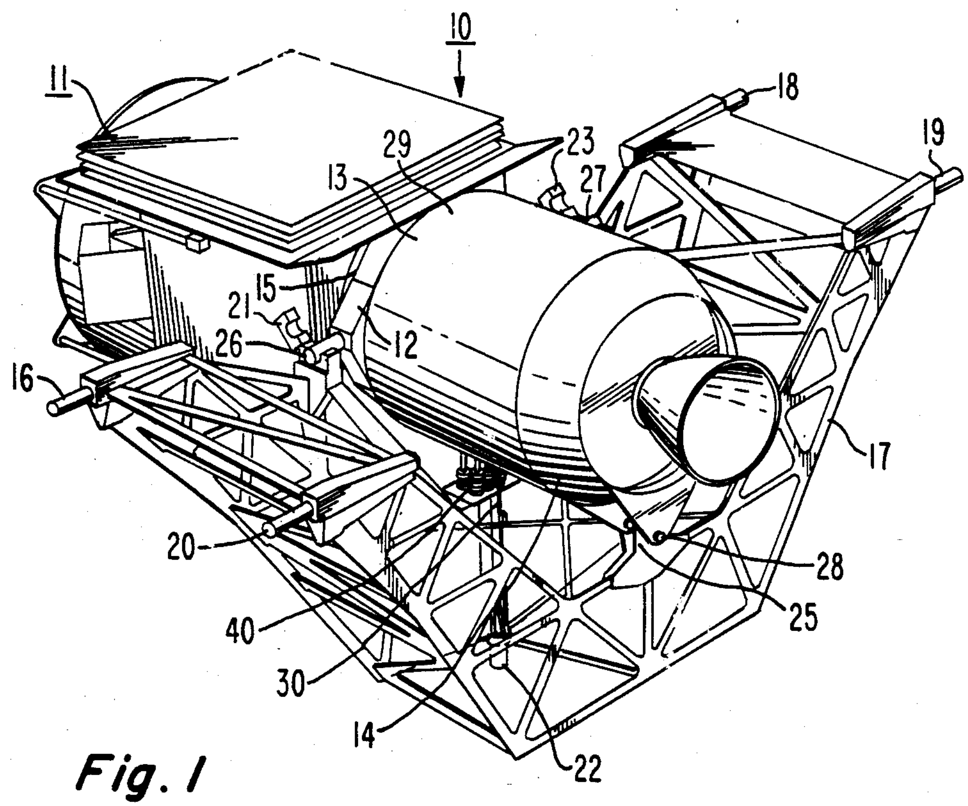
FIG. 1 illustrates the satellite/perigee stage assembly mounted to the orbiter cradle assembly.

Referring to FIG. 1 there is illustrated a satellite/perigee stage assembly 10 mounted to the orbiter cradle assembly 17. The satellite/perigee stage assembly 10 comprises the satellite 11 and perigee stage 13 connected to each other using a conventional Marmon clamp (Vee-clamp) 15. The satellite 11 refers to the payload which is placed in the final orbit and includes the communication systems, batteries, solar panel thrusters, etc. The perigee stage 13 comprises a perigee motor 29, a payload attachment fitting 12 and an aft support structure 14. The payload attachment fitting 12 and aft support structure 14 are connected to the perigee motor 29 using end flanges and bolts that extend about the motor. The perigee motor 29 selected for example, is the Morton Thiokol Incorporated (MTI) 63E, a derivative of the MTI 63-inch (1600 millimeter) diameter proven space motor family.

Figure 2:
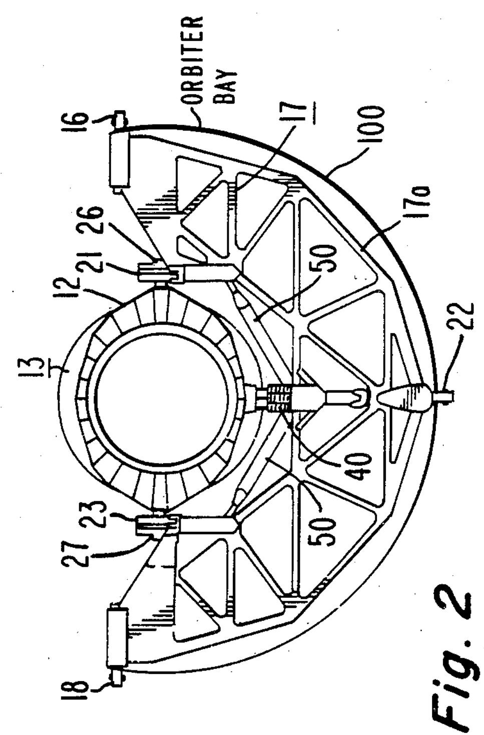
FIG. 2 is a sketch of the orbiter bay looking aft with the cradle assembly and perigee stage therein.

The shuttle cradle assembly 17 is a U-shaped truss network of beams adapted to fit into the cargo bay of the orbiter and serves as a reusable structure for launching a number of different spacecraft, such as spacecraft/perigee stage assembly 10 in multiple launches. The cradle planar truss members are machined from plates of aluminum and are bolted together with high strength fasteners. Forward and aft U-shaped plates, **17*a* and 17*b* respectively, extend vertically from the bay floor and are spaced by longitudinally extending plates. Out-of-plane tubular members 50 provide further stiffness to the cradle. The cradle assembly 17 mounted within the cargo bay of the shuttle is illustrated in FIG. 2**.

The cargo bay is an elongated cylindrical structure somewhat like that of an aircraft which receives the cradle assembly 17 nested therein. When the shuttle reaches the launch position in space, the satellite/perigee stage assembly is ejected from the cradle assembly and the cradle assembly remains in the cargo bay and is returned to earth to receive a new satellite/perigee stage assembly to be secured thereto.

The cargo bay of the orbiter has passive longeron latches (not shown) for receiving the trunnions 16 and 20 (FIG. 1) extending from the port side of the cradle assembly 17 and trunnions 18 and 19 extending from the starboard side of the cradle assembly 17. The trunnions 16, 18, 19 and 20 are rods which extend in a lateral direction from the cradle assembly 17.

The mounting surface of the cargo bay includes a keel receptacle for receiving the keel fitting 22 extending from the bottom center of the cradle assembly 17 under the forward truss member 17*a*. See FIGS. 2 and 3. The keel fitting 22 is a cylindrical member which depends from the truss network and is designed to mate with a receptacle in the cargo bay. All cradles to be mounted and launched by the launch vehicle are required by NASA to have trunnions and keel fittings.

Figure 3:
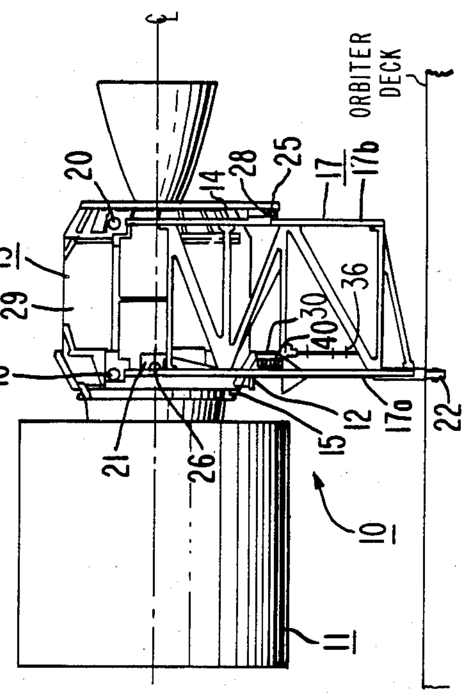
FIG. 3 is a sketch illustrating how the satellite/perigee stage assembly is mounted relative to the centerline of the shuttle.

The satellite/perigee stage assembly 10 is mounted longitudinally in the orbiter bay with the satellite 11 cantilevered from the payload attachment fitting 12 by means of a 47-inch (1194 millimeter) diameter Marmon clamp interface 15. See FIG. 3. The satellite 11 and clamp 15 are entirely forward of the cradle assembly 17 as shown in FIG. 3 permitting use of the full orbiter 15 foot diameter for the satellite equipment envelope.

The satellite/perigee stage assembly 10 is supported in the cradle assembly on a three point, statically determinate system. Cylindrical trunnions 26 and 27 project laterally from the payload attachment fitting 12 and engage releasable latches 21 and 23 on the cradle assembly 17. A third trunnion 28 extends longitudinally on the aft support assembly 14 and engages a releasable latch 25 on the cradle assembly 17. See FIG. 1. The latches 21, 23 and 25 are standard STS motor driven, reversible active payload retention latches.

Figure 4:
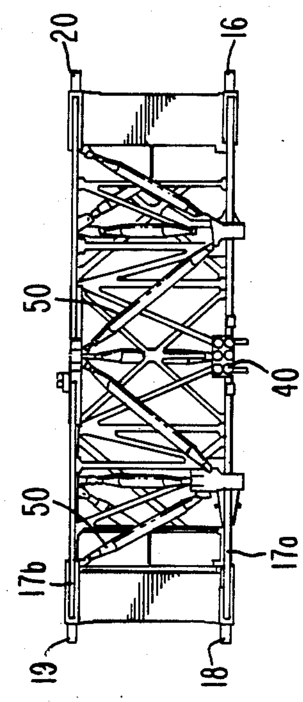
FIG. 4 is a top view of the cradle assembly with the satellite/perigee stage assembly removed.

A set of six springs 40 are compressed between the payload attachment fitting and the cradle assembly to provide the separation force between the two bodies. The six titanium springs 40 each provide approximately 300 pounds of force when fully compressed. The assembly 10 center of mass (CG) is in line with the direction of the spring force. The springs 40 are in a cluster arranged in two rows of three located to minimize tip off effects as shown in FIG. 4. The first row is along the forward truss member 17*a* with the second row just aft of the first row.

Figure 5:
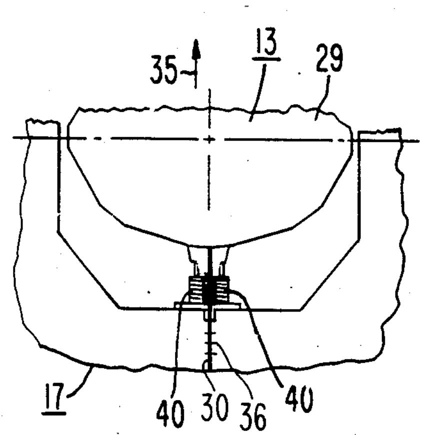
FIG. 5 is a partial sketch of the cradle and perigee stage looking forward from aft and illustrating the springs and restraining cable.

A restraint cable 30 that resists the spring force keeps the assembly 10 against the retention latch attach points at latches 21, 23 and 25 until the latch release is verified and deployment commanded. If the release is not verified, the latches can be reclosed and, if necessary, the assembly brought back to earth in the Shuttle. Deployment is achieved after latch opening by release or cutting of a restraint cable effecting a single point release. This can be accomplished by electrically initiated pyrotechnic devices 36 along the cable 30 as illustrated in FIGS. 3 and 5. Three separate pyrotechnic devices are used for redundancy.

Figure 6:
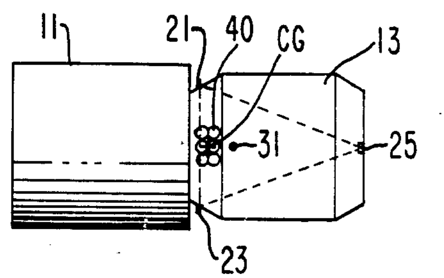
FIG. 6 is a sketch of the satellite/perigee stage as viewed from the cradle assembly illustrating the position of the springs, CG and cable attachment.

Referring to FIG. 6 there is illustrated the position of the six springs 40 with respect to the assembly 10. The CG, or center of mass, is indicated at the center. The cable 30 attachment point 31 is also indicated within the triangle formed of the latch points 21, 23 and 25 as indicated by dashed lines. By placing the point 31 within the triangle and by preloading the cable to a value exceeding the total spring force, the single point attachment against the springs does not permit motion of the assembly when latches 21, 23 and 25 are opened.

As shown in FIG. 5 the spring assembly includes push rods and pads that extend from the force springs and push in the exit direction 35. When a command is received, the pyrotechnic devices are fired and the cable is severed and the springs 40 via the rods force the assembly out of the bay without significant spinning or rotation. This is a single point release system.

A retention rod may be used in place of the cable 30. The cable 30 is preferably made of Kevlar to provide strength, lightweight and also some flexibility. This flexibility allows the cradle to flex with respect to the perigee stage during shuttle launch. In the preferred case the cable 30 is attached just aft of and centered with respect to the springs.

What is claimed is:

1. A spacecraft assembly separation apparatus comprising:

a support structure, latching means for releasably securing said spacecraft assembly to said structure, spacecraft assembly separation and acceleration spring means secured to said structure comprising means for applying forces in the same direction to said spacecraft assembly at points located near the center of mass of the spacecraft assembly and intermediate said latching points to accelerate said spacecraft in that direction without significant rotation and retaining means located intermediate said latching points for providing centralized single point retention of said spacecraft assembly against said acceleration spring means when said latches are opened, and means for disconnecting said retaining means for providing single point release.

2. Apparatus for separating a spacecraft assembly from a support structure such as the cargo bay of a shuttle orbiter, said apparatus comprising:

multipoint latching means including multiple spaced retractable latches for latching said assembly at multiple points to the support structure, imaginary lines joining said points forming a boundary, assembly separation and acceleration means secured to said support structure comprising spring means for applying ejecting forces against said assembly within said boundary and near the center of mass of said assembly to accelerate said assembly away from the support structure without significant rotation;

retaining means secured at one end to said support structure and at the other end to a single point contact on said assembly intermediate said latches and within said boundary for retaining said assembly against compressed spring means eventhough said latches are open and to allow said latches to be relatched if any failure of a latch occurs, and means for disconnecting said retaining means to provide when said latches are open a single point release.

3. Apparatus for separating a spacecraft assembly from a support structure such as the cargo bay of a shuttle orbiter, said apparatus comprising:

three point latching means including three spaced retractable latches for latching said assembly at three points to the support structure, imaginary lines joining said points forming a triangle, assembly separation and acceleration means secured to said support structure comprising spring means for applying ejecting forces against said assembly within said triangle and near the center of mass of said assembly to accelerate said assembly away from the support structure without significant rotation;

retaining means secured at one end to said support structure and at the other end to a single point contact on said assembly intermediate said latches and within said triangle for retaining said assembly against compressed spring means eventhough said latches are open and to allow said latches to be relatched if any failure of a latch occurs; and means for disconnecting said retaining means to provide when said latches are open a single point release.

4. The combination of claim 3 wherein said spring means includes a plurality of springs positioned about the center of mass of said assembly.

5. The combination of claim 4 wherein said retaining means is a cable between the support structure and the spacecraft and said disconnecting means includes a pyrotechnic device.

6. A satellite/perigee stage assembly support and separation apparatus for support of said assembly in the cargo bay of the space shuttle where the assembly includes a junction clamping means for releasably joining the perigee stage to the satellite, said apparatus comprising:

a U-shaped cradle assembly removably mounted across the bay and between said cargo bay and said perigee stage, said perigee stage having starboard and port extending trunnions near the forward end of said perigee stage and an aft trunnion, first and second retractable latches when closed latching said perigee stage to said cradle assembly at said port and starboard trunnions, and a third retractable latch when closed latching the aft trunnion, assembly separation and acceleration means secured to said cradle assembly comprising acceleration spring means for applying forces in the same direction to said satellite at points located near the center of mass of the satellite/perigee stage assembly and intermediate said first and second retractable latches to accelerate said satellite/perigee stage assembly in said direction without significant rotation and single point retaining means located intermediate said first, second and third latches for retaining said satellite/perigee stage assembly against said acceleration spring means when said latches are opened, and means for disconnecting said retaining means for providing single point release.

7. The combination of claim 5 wherein said spring means includes a plurality of springs positioned about the center of mass of said satellite/perigee stage assembly.

8. The combination of claim 5 wherein said disconnecting means includes a pyrotechnic device.

9. The combination of claim 6 wherein said clamping means is a Marmon clamp.

10. The combination of claim 6 wherein said retaining means is a cable.

11. The combination of claim 10 wherein said cable is of Kevlar.

12. The combination of claim 6 wherein said retaining means is a rod.

* * * * *